(12) United States Patent
Kintaka

(10) Patent No.: US 9,543,573 B2
(45) Date of Patent: Jan. 10, 2017

(54) METHOD OF PRODUCING IRON PHOSPHATE, LITHIUM IRON PHOSPHATE, ELECTRODE ACTIVE SUBSTANCE, AND SECONDARY BATTERY

(71) Applicant: MURATA MANUFACTURING CO., LTD., Nagaokakyo-Shi, Kyoto-fu (JP)

(72) Inventor: Yuji Kintaka, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 0 days.

(21) Appl. No.: 13/767,938

(22) Filed: Feb. 15, 2013

(65) Prior Publication Data

US 2013/0157134 A1 Jun. 20, 2013

Related U.S. Application Data

(63) Continuation of application No. PCT/JP2011/067839, filed on Aug. 4, 2011.

(30) Foreign Application Priority Data

Aug. 18, 2010 (JP) .................................. 2010-182990

(51) Int. Cl.
*H01M 4/136* (2010.01)
*C01B 25/37* (2006.01)
(Continued)

(52) U.S. Cl.
CPC .............. *H01M 4/136* (2013.01); *C01B 25/37* (2013.01); *C01B 25/45* (2013.01); *H01M 4/1397* (2013.01);
(Continued)

(58) Field of Classification Search
None
See application file for complete search history.

(56) References Cited

U.S. PATENT DOCUMENTS

2007/0248520 A1* 10/2007 Faulkner ..................... 423/306
2009/0111024 A1* 4/2009 Wurm et al. ................. 429/221

FOREIGN PATENT DOCUMENTS

| CN | 101723344 | * | 6/2010 |
| JP | 2002-211908 A | | 7/2002 |

(Continued)

OTHER PUBLICATIONS

Wu et al., Synthesis and electrochemical properties of metals-doped LiFePO4 prepared from the FeSO4·7H2O waste slag, Journal of Power Sources, 189, Sep. 11, 2008, p. 681-684.*

(Continued)

*Primary Examiner* — Patrick Ryan
*Assistant Examiner* — Christopher Domone
(74) *Attorney, Agent, or Firm* — Arent Fox LLP

(57) ABSTRACT

A mixed aqueous solution is prepared in which a phosphorus source, a divalent Fe compound, and an oxidant are mixed at a predetermined ratio. Then, this mixed aqueous solution is dropwise added into a buffer solution having a pH value of 1.5 to 9, thereby to produce a precipitated powder of $FePO_4$. This $FePO_4$ is synthesized with a lithium compound to obtain $LiFePO_4$. An electrode active substance containing this $LiFePO_4$ as a major component is used as a positive electrode material of a secondary battery.

12 Claims, 5 Drawing Sheets

(51) Int. Cl.
*C01B 25/45* (2006.01)
*H01M 4/1397* (2010.01)
*H01M 4/58* (2010.01)
*H01M 10/052* (2010.01)

(52) U.S. Cl.
CPC ......... *H01M 4/5825* (2013.01); *H01M 10/052* (2013.01); *Y02E 60/122* (2013.01); *Y02P 70/54* (2015.11)

(56) References Cited

FOREIGN PATENT DOCUMENTS

| JP | 2009-534288 A | 9/2009 |
| JP | 2009-295465 A | 12/2009 |

OTHER PUBLICATIONS

Winter et al., What Are Batteries, Fuel Cells, and Supercapacitors?, Chemical Reviews, vol. 104, No. 14, 2004, p. 4245-4269.*
PCT/JP2011/067839 Written Opinion dated Aug. 18, 2011.

* cited by examiner

DIFFRACTION ANGLE 2θ (°)

METHOD OF PRODUCING IRON PHOSPHATE, LITHIUM IRON PHOSPHATE, ELECTRODE ACTIVE SUBSTANCE, AND SECONDARY BATTERY

CROSS REFERENCE TO RELATED APPLICATIONS

The present application is a continuation of International application No. PCT/JP2011/067839, filed Aug. 4, 2011, which claims priority to Japanese Patent Application No. 2010-182990, filed Aug. 18, 2010, the entire contents of each of which are incorporated herein by reference.

FIELD OF THE INVENTION

The present invention relates to a method of producing iron phosphate, lithium iron phosphate, an electrode active substance, and a secondary battery, and more particularly to a method of producing iron phosphate which will be a source material of lithium iron phosphate, lithium iron phosphate using the iron phosphate produced by this production method, an electrode active substance containing this lithium iron phosphate as a major component, and a secondary battery containing this electrode active substance in a positive electrode.

BACKGROUND OF THE INVENTION

In accordance with enlargement of the market of portable electronic apparatus such as portable phones, notebook-type personal computers, and digital cameras, a secondary battery having a large energy density and having a long lifetime is expected as a cordless power source of these electronic apparatus.

Then, in order to meet such a demand, a secondary battery having alkali metal ions such as lithium ions as a charge carrier and using the electrochemical reaction accompanying the donation and receipt of the electric charge thereof is being developed. In particular, a lithium ion secondary battery having a large energy density is currently widely prevalent.

Among the constituent elements of a secondary battery, an electrode active substance is a substance that directly contributes to battery electrode reaction which includes charging reaction and discharging reaction, and hence plays a central role of the secondary battery. In other words, the battery electrode reaction is a reaction that is generated accompanying giving and receiving of the electrons by application of a voltage to the electrode active substance that is electrically connected to the electrode disposed in the electrolyte, and proceeds during the charging and discharging of the battery. Therefore, as described above, the electrode active substance plays a central role of the secondary battery from the viewpoint of the system.

Then, in the above-described lithium ion secondary battery, a lithium-containing transient metal oxide is used as a positive electrode active substance; a carbon material is used as a negative electrode substance; and charging and discharging are carried out by using the intercalation reaction and elimination reaction of lithium ions to these electrode active substances.

As a lithium-containing transient metal oxide used as the positive electrode active substance, lithium cobaltate ($LiCoO_2$), lithium nickelate ($LiNiO_2$), lithium manganate ($LiMn_2O_4$), and others are known from the past. Among these, $LiCoO_2$ is widely adopted because of having good charging/discharging characteristics and energy density as compared with $LiMn_2O_4$ or the like.

However, $LiCoO_2$ has problems of having large resource restrictions, being expensive, and containing highly toxic Co. Also, $LiCoO_2$ releases a large amount of oxygen at a temperature around 180° C., thereby raising a problem also in view of safety in a lithium ion battery using a flammable organic electrolyte. For this reason, when $LiCoO_2$ is used as an electrode active substance, it is suitable for a small-capacity secondary battery but has a lot of problems to be solved in using it in a high-output large-capacity secondary battery.

Thus, in recent years, as an electrode active substance for a lithium ion secondary battery, lithium iron phosphate ($LiFePO_4$) having an olivine-type crystal structure is attracting people's attention. This $LiFePO_4$ contains phosphorus (P) as a constituent element, and all of the oxygen is covalently bonded firmly to phosphorus. For this reason, it does not release oxygen even at a high temperature, is stable in thermal stability, and is considered to be suitable for application to an electrode active substance for a high-output large-capacity secondary battery.

Then, Non-Patent Document 1, for example, reports synthesis and electrochemical properties of $LiFePO_4$ doped with a metal obtained from a waste slag of $FeSO_4 \cdot 7H_2O$.

In this Non-Patent Document 1, first, after $FeSO_4 \cdot 7H_2O$ is dissolved into water, $H_3PO_4$ and $H_2O_2$ are added and stirred, thereby to prepare a mixed aqueous solution. During the process, divalent Fe is oxidized to be trivalent by oxidation function of $H_2O_2$. Thereafter, ammonia water is dropwise added to adjust the pH value to be about 2.1, whereby a precipitated powder of $FePO_4 \cdot nH_2O$ is obtained.

In other words, in Non-Patent Document 1, by oxidation function of $H_2O_2$ and dropwise addition of ammonia water, a precipitated powder of an Fe compound ($FePO_4 \cdot nH_2O$) containing trivalent Fe that is stable in ambient atmosphere is obtained from an Fe compound ($FeSO_4 \cdot 7H_2O$) containing divalent Fe that is unstable in ambient atmosphere and is liable to be oxidized.

Further, crystalline $LiFePO_4$ is obtained by allowing $FePO_4 \cdot nH_2O$ to react with a lithium compound to obtain amorphous $LiFePO_4$ and thereafter performing a thermal treatment.

Non-Patent Document 1: "Synthesis and electrochemical properties of metals-doped LiFePO4 prepared from the FeSO4.7H2O waste slag" by Ling Wu et al., Journal of Power Sources, 189, 2009, p. 681-684

SUMMARY OF THE INVENTION

However, though $FePO_4 \cdot nH_2O$ that is present stably in ambient atmosphere is obtained in Non-Patent Document 1, it has been found out by an experiment result of the present inventor that a dispersion unevenness is generated because the elements of Fe and P are not uniformly dispersed, and also the particle size variation is large, and plate-shaped particles are contained. This seems to be due to the following reason.

In Non-Patent Document 1, ammonia water is dropwise added into the mixed aqueous solution during the process of producing $FePO_4 \cdot nH_2O$, so that the pH value around the dropwise addition of ammonia water becomes large temporarily, and for this reason, $Fe(OH)_3$ is produced preferentially to $FePO_4$. By stirring the mixed aqueous solution, the pH value around the dropwise addition gradually decreases, and $FePO_4$ comes to be produced. However, $Fe(OH)_3$ once produced is hardly changed to $FePO_4$, and remains as a precipitate while still being $Fe(OH)_3$. For this reason, it seems that the produced $FePO_4.nH_2O$ has a dispersion unevenness because the elements of Fe and P are not uniformly dispersed, and also the particle size variation is large, and plate-shaped particles are contained.

Therefore, even if $LiFePO_4$ is prepared by using $FePO_4.nH_2O$ produced by a method such as disclosed in Non-Patent Document 1 as a source material and is used as an electrode active substance (positive electrode material) of a secondary battery, it is difficult to obtain a desired secondary battery having a large capacity and a high output because, as described above, $FePO_4.nH_2O$ is not purified to have a high purity.

The present invention has been made in view of the aforementioned circumstances, and an object thereof is to provide a method of producing iron phosphate capable of obtaining iron phosphate having a high purity at a high efficiency, lithium iron phosphate obtained by using this production method, an electrode active substance containing this lithium iron phosphate as a major component, and a secondary battery containing the electrode active substance in a positive electrode.

The present inventor has made eager researches in order to achieve the aforementioned object and has obtained a knowledge that iron phosphate having a high purity in which Fe and P are uniformly or approximately uniformly dispersed can be produced at a high efficiency without generation of dispersion unevenness in the element distribution of Fe and P by dropwise adding an aqueous solution in which a phosphorus (P) source and an iron compound containing trivalent iron (Fe) are dissolved into a buffer solution adjusted to have a pH value of 1.5 to 9 to bring the solutions into contact.

The present invention has been made based on such a knowledge, and a method of producing iron phosphate according to the present invention comprises bringing a mixed aqueous solution in which a phosphorus source and an iron compound containing trivalent iron are dissolved into contact with a buffer solution having a pH value of 1.5 to 9, thereby to produce a powder of iron phosphate.

Also, lithium iron phosphate according to the present invention is obtained by synthesizing the iron phosphate produced by the above-described production method and a lithium compound.

Also, an electrode active substance according to the present invention is an electrode active substance used as an active substance of a secondary battery that repeats charging and discharging by battery electrode reaction, wherein lithium iron phosphate described above is contained as a major component.

Also, a secondary battery according to the present invention has a positive electrode, a negative electrode, and an electrolyte, wherein the aforesaid positive electrode is formed of the electrode active substance described above.

According to the above-described method of producing iron phosphate, iron phosphate having a high purity in which the element distribution of Fe and P is uniformly or approximately uniformly dispersed can be obtained at a high efficiency without generation of $Fe(OH)_3$ because a mixed aqueous solution in which a phosphorus source and an iron compound containing trivalent iron are dissolved is brought into contact with a buffer solution having a pH value of 1.5 to 9 thereby to produce a powder of iron phosphate. Moreover, by the buffering function of the buffer solution, fluctuation in the pH value at the time of producing the powder is small, and a powder of iron phosphate with fine particles and with a uniform particle size can be obtained.

Also, according to the lithium iron phosphate described above, lithium phosphate having a high purity and being suitable as an electrode active substance for a secondary battery can be obtained because the lithium phosphate is obtained by synthesizing the iron phosphate produced by the above-described production method and a lithium compound.

Also, according to the electrode active substance of the present invention, an electrode active substance being safe and having a high energy density can be obtained because the electrode active substance used as an active substance of a secondary battery that repeats charging and discharging by battery electrode reaction contains lithium iron phosphate described above as a major component.

Also, according to a secondary battery of the present invention, a secondary battery being excellent in view of safety and having a high capacity and a high output can be obtained because the secondary battery has a positive electrode, a negative electrode, and an electrolyte, and the aforesaid positive electrode is formed of the electrode active substance described above.

DETAILED DESCRIPTION OF PREFERRED EMBODIMENTS OF THE INVENTION

Figure 1:
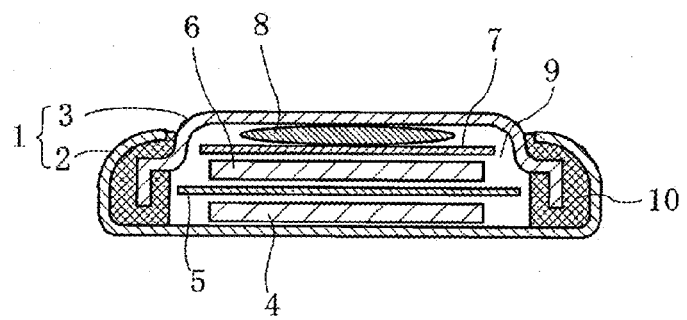
FIG. 1 is a cross-sectional view illustrating one embodiment of a coin-type battery as a secondary battery according to the present invention.

Next, best modes for carrying out the present invention will be described in detail.

With regard to the iron phosphate according to the present invention, a mixed aqueous solution in which a P source and trivalent Fe are dissolved is brought into contact with a buffer solution having a pH value of 1.5 to 9 thereby to produce a powder (coprecipitated powder) of $FePO_4.nH_2O$ (iron phosphate; hereafter referred to as "$FePO_4$"). Then, by this, Fe and P are uniformly dispersed, whereby a $FePO_4$ powder having a high purity with fine particles and with a uniform particle size can be produced at a high efficiency.

In other words, when an alkali solution such as ammonia water or NaOH is dropwise added into a mixed aqueous solution in which a P source and an iron compound containing trivalent Fe (hereafter referred to as "trivalent Fe compound") are dissolved as in the Non-Patent Document 1, the pH value around the dropwise addition becomes large temporarily, and for this reason, $Fe(OH)_3$ is produced preferentially to $FePO_4$. In this case, by stirring the mixed aqueous solution, the pH value around the dropwise addition decreases, and $FePO_4$ comes to be produced. However, $Fe(OH)_3$ once produced is hardly changed to $FePO_4$. For this reason, the obtained coprecipitated powder becomes a mixture of $FePO_4$ and $Fe(OH)_3$, and a dispersion unevenness is generated because Fe and P are not uniformly dispersed, so that the particle size distribution will have a large variation, and also the shape will be non-uniform.

In contrast, when a mixed aqueous solution in which a P source and a trivalent Fe compound are dissolved is dropwise added into and brought into contact with a buffer solution adjusted to have a pH value of 9 or less, it is possible to avoid a situation in which the mixed aqueous solution has a high pH value such that $Fe(OH)_3$ is produced. Therefore, $FePO_4$ can be produced without production of $Fe(OH)_3$. Then, by this, $FePO_4$ having a high purity in which the element distribution of Fe and P is uniform or approximately uniform can be produced at a high efficiency. Moreover, by buffering function of the buffer solution, the fluctuation of the pH value is restrained, so that the fluctuation of the pH value at the time of production of $FePO_4$ powder is small, and $FePO_4$ powder having a spherical form with uniform particle size can be obtained.

However, the pH value of the buffer solution is preferably 1.5 or more. This is because, when the pH value of the buffer solution is less than 1.5, the amount of Fe and P that are eluted without being precipitated increases, raising a fear that the yield of the powder production may decrease.

Therefore, there is a need to adjust the pH value of the buffer solution to be from 1.5 to 9.

The aforementioned $FePO_4$ can be produced specifically by a method such as the following.

First, an Fe compound containing divalent Fe such as $FeSO_4.7H_2O$ or $FeCl_2.4H_2O$ (hereafter referred to as "divalent Fe compound"), a P source such as $H_3PO_4$, $(NH_4)H_2PO_4$, or $(NH_4)_2HPO_4$, and an oxidant such as $H_2O_2$ are prepared and mixed so as to attain a predetermined ratio, thereby to prepare a mixed aqueous solution. Here, the divalent Fe compound and the P source are mixed so that the two will be equal or approximately equal in amount in a molar ratio, and the oxidant is added in an excessive amount (for example, about 1.5 times larger in amount in a molar ratio) to the divalent Fe compound so that the divalent Fe will be completely oxidized to trivalent Fe.

Subsequently, a buffer solution adjusted to have a pH value of 1.5 to 9 is prepared.

Constituent substances and method of production of the buffer solution are not particularly limited as long as the buffer solution has a buffering function in the pH value range of 1.5 to 9, and a known method can be used. For example, as a method of preparing a buffer solution, a method of preparing it by mixing weak acid—conjugate base such as acetic acid—ammonium acetate, lactic acid—sodium lactate, glycolic acid—sodium glycolate, or maleic acid—disodium maleate is widely known in the art, and the buffer solution can be prepared by suitably adjusting the mixing ratio of these weak acid—conjugate base so that the pH value will be within a range of 1.5 to 9. Also, the method of preparation is not limited to a combination of weak acid—conjugate base, so that a known method such as a method different from the above one, for example, a combination of weak acid—strong base or the like, can be used. Further, the buffer solution can be prepared also by dissolving into a solvent a compound having a buffering function in a single state, for example, a compound of weak acid and weak base such as ammonium acetate or glycine (aminoacetic acid), a compound of weak acid and strong base such as trisodium citrate, or the like.

Subsequently, this buffer solution is stirred at an ordinary temperature, and the aforesaid mixed aqueous solution is dropwise added into and brought into contact with the buffer solution while monitoring the pH value of the buffer solution, whereby a brown precipitated powder of $FePO4$ is obtained.

Here, the pH value of the buffer solution decreases according as the amount of dropwise addition of the mixed aqueous solution increases; however, the dropwise addition of the mixed aqueous solution is preferably ended before the pH value reaches 1.5. This is because, when the dropwise addition of the mixed aqueous solution is continued even after the pH value becomes 1.5 or lower, the precipitated $FePO_4$ begins to be dissolved, and Fe and P are eluted, thereby raising a fear of inviting decrease in the yield of the precipitated powder.

Lithium iron phosphate ($LiFePO_4$) having a high purity can be obtained by using $FePO_4$ produced in this manner.

In other words, the above-described $FePO_4$ powder and lithium compound are weighed so that these $FePO_4$ powder and lithium compound may satisfy a molar ratio of 1:1, and this weighed material is put into a ball mill together with pure water and a polymer dispersing agent such as polycarboxylic acid and mixed and crushed to obtain a mixed powder.

Subsequently, this mixed powder is dried and granulated and thereafter a heat treatment is carried out for about 5 hours in a predetermined reducing atmosphere at a predetermined temperature (for example, 500 to 700° C.). Then, by this, trivalent Fe is reduced to divalent Fe, whereby a powder of $LiFePO_4$ is obtained.

Here, the above lithium compound is not particularly limited, so that, for example, $Li(CH_3COO).2H_2O$, $LiOH.H_2O$, or the like can be used.

$LiFePO_4$ obtained in this manner can be suitably used as an electrode active substance for a secondary battery without generation of a different phase such as $Fe(OH)_3$.

In other words, with regard to the electrode active substance containing $LiFePO_4$ of the present invention as a major component, the source materials are inexpensive and easily obtainable without resource restrictions such as in the case of Co, and also a secondary battery being excellent in view of safety and having a large capacity and a high output can be realized at a low cost.

Next, a secondary battery using the aforesaid electrode active substance will be described in detail.

FIG. 1 is a cross-sectional view illustrating a coin-type secondary battery as one embodiment of a secondary battery according to the present invention. In the present embodiment, the electrode active substance containing $LiFePO_4$ as a major component is used as a positive electrode active substance.

A battery can 1 has a positive electrode case 2 and a negative electrode case 3, and the positive electrode case 2 and negative electrode case 3 are both formed to have a thin disk-like plate shape. Also, a positive electrode 4 in which the electrode active substance is formed into a sheet shape is disposed at the center of the bottom part of the positive electrode case 2 constituting a positive electrode collector. Also, a separator 5 formed of porous film such as polypropylene is stacked on the positive electrode 4, and a negative electrode 6 is stacked on the separator 5. As the negative electrode 6, for example, one in which a metal foil of lithium is superposed on Cu or one in which a lithium-incorporating material such as graphite or hard carbon is applied on the aforementioned metal foil can be used. Then, a negative electrode collector 7 formed of Cu or the like is stacked onto the negative electrode 6, and a spring 8 made of metal is mounted on the negative electrode collector 7. Also, the inside space is filled with an electrolyte 9, and the negative electrode case 3 is fixed onto the positive electrode case 2 against an urging force of the spring 8 made of metal and is sealed through the intermediary of a gasket 10.

Next, one example of a method for producing the above secondary battery will be described in detail.

First, $LiFePO_4$ serving as a major component of the electrode active substance is formed into an electrode shape. For example, $LiFePO_4$ is mixed together with an electroconductive auxiliary agent and a binding agent, and a solvent is added to prepare a slurry. The slurry is applied onto a positive electrode collector by an arbitrary application method and dried to form a positive electrode 4.

Also, the electroconductive auxiliary agent is not particularly limited, so that, for example, carbonaceous fine particles such as graphite, carbon black, or acetylene black, a carbon fiber such as vapor-grown carbon fiber (VGCF), carbon nanotube, or carbon nanohorn, an electroconductive polymer such as polyaniline, polypyrrole, polythiophene, polyacetylene, or polyacene, or the like can be used. Also, two or more kinds of electroconductive auxiliary agents can be mixed and used. Here, the content of the electroconductive auxiliary agent in the positive electrode 4 is preferably from 10 to 80 wt %.

Also, the binding agent is not particularly limited, so that, for example, various resins such as polyethylene, polyvinylidene fluoride, polyhexafluoropropylene, polytetrafluoroethylene, polyethylene oxide, or carboxymethyl cellulose can be used.

Further, the solvent is not particularly limited, so that, for example, a basic solvent such as dimethyl sulfoxide, dimethylformamide, N-methyl-2-pyrrolidone, propylene carbonate, diethyl carbonate, dimethyl carbonate, or γ-butyrolactone, a nonaqueous solvent such as acetonitrile, tetrahydrofuran, nitrobenzene, or acetone, a protonic solvent such as methanol or ethanol, or the like can be used.

Also, the kind of the solvent, the blending ratio of the organic compound and the solvent, the kind of the additives, the amount of addition thereof, and the like can be arbitrarily set by considering the demanded characteristics, productivity, and the like of the secondary battery.

Subsequently, this positive electrode 4 is impregnated with the electrolyte 9 so as to allow the aforesaid electrolyte 9 to penetrate into the positive electrode 4, and thereafter the positive electrode 4 is mounted on the positive electrode collector at the center of the bottom part of the positive electrode case 2. Subsequently, the separator 5 impregnated with the aforesaid electrolyte 9 is stacked onto the positive electrode 4, and further the negative electrode 6 and the negative electrode collector 7 are sequentially stacked, followed by injecting the electrolyte 9 into the inside space. Then, the spring 8 made of metal is mounted on the negative electrode collector 9; the gasket 10 is disposed in the peripheries; and the negative electrode case 3 is fixed to the positive electrode case 2 with use of a caulking machine or the like to perform outer-cladding and sealing, thereby to prepare the coin-type secondary battery.

Here, the above electrolyte 9 intervenes between the positive electrode 4 and the negative electrode 6 which is an opposing electrode, and performs electric charge carrier transportation between the two electrodes. As the electrolyte 9 such as this, an electrolyte having an electric conductivity of $10^{-5}$ to $10^{-1}$ S/cm at room temperature can be used and, for example, an electrolytic solution in which an electrolyte salt is dissolved into an organic solvent can be used.

Here, as the electrolyte salt, for example, $LiPF_6$, $LiClO_4$, $LiBF_4$, $LiCF_3SO_3$, $Li(CF_3SO_2)_2$, $Li(C_2F_5SO_2)_2N$, $Li(CF_3SO_2)_3C$, $Li(C_2F_5SO_2)_3C$, or the like can be used.

Also, as the organic solvent, ethylene carbonate, propylene carbonate, dimethyl carbonate, diethyl carbonate, methyl ethyl carbonate, γ-butyrolactone, tetrahydrofuran, dioxolane, sulfolane, dimethylformamide, dimethylacetamide, N-methyl-2-pyrrolidone, or the like can be used.

In this manner, according to the present embodiment, a secondary battery having a large capacity and a high output and being excellent also in view of safety can be realized at a low cost.

Here, the present invention is not limited to the above-described embodiment, so that various modifications can be made within a range that does not depart from the gist. For example, in the above-described embodiment, divalent Fe is oxidized to be trivalent Fe to obtain a trivalent Fe compound by mixing a divalent Fe compound and an oxidant in the process of producing $FePO_4$; however, a trivalent Fe compound may be used from the beginning and may be dropwise added into and brought into contact with the buffer solution and, as an Fe compound in this case, for example, $FeCl_3 \cdot 6H_2O$ or the like can be used.

Also, in the above-described embodiment, a coin-type secondary battery has been described; however, the battery shape is not particularly limited, so that the present invention can be applied to cylindrical type, prismatic type, sheet type, and the like. Also, the outer-cladding method is not particularly limited, so that a metal case, a mold resin, an aluminum laminate film, or the like may be used.

Next, Examples of the present invention will be specifically described.

EXAMPLE 1

Preparation of Sample Number 1

$FeSO_4 \cdot 7H_2O$ was dissolved into water, and a mixed aqueous solution in which $H_3PO_4$ (85% aqueous solution) as a P source and $H_2O_2$ (30% aqueous solution) as an oxidant were added thereto was prepared. Here, $FeSO_4 \cdot 7H_2O$ and $H_3PO_4$ were blended so as to attain a molar ratio of 1:1, and the concentrations thereof were both set to be 0.4 mol/L. Also, the amount of addition of $H_2O_2$ was set to be 1.5 times larger than that of $FeSO_4 \cdot 7H_2O$ in a molar ratio. Also, the pH value of this mixed aqueous solution was measured with a result of 1.2.

Next, water was added into acetic acid, and ammonium acetate was dissolved into this to prepare a buffer solution. Here, the molar ratio of acetic acid and ammonium acetate was 1:1, and the concentrations of acetic acid and ammonium acetate were both set to be 0.5 mol/L. The pH value of this buffer solution was measured with a result of 4.6, which was confirmed to be within the range (1.5 to 9) of the present invention.

Subsequently, while stirring the buffer solution at an ordinary temperature, the aforesaid mixed aqueous solution was dropwise added into the buffer solution, thereby to prepare a precipitated powder. Here, the pH value of the buffer solution decreased according as the amount of dropwise addition of the mixed aqueous solution increased, and the dropwise addition of the mixed aqueous solution into the buffer solution was ended at the time point at which the pH value became 2.0. The obtained precipitated powder was filtered and washed with a large amount of water, followed by heating to a temperature of 120° C. and drying to prepare a brown sample of sample number 1.

Preparation of Sample Number 2

A mixed aqueous solution was prepared by the same method and procedure as those of the sample number 1. Subsequently, while stirring this mixed aqueous solution, ammonia water was dropwise added to prepare a precipitated powder. In the mixed aqueous solution, a phenomenon of temporary change of color to red was seen together with production of a thin brown precipitated powder in the vicinity of the site where the ammonia water was dropwise added.

Here, this red color was thinned by stirring the mixed aqueous solution; however, when ammonia water was dropwise added, the vicinity of the dropwise addition thereof temporarily turned red again. The dropwise addition of ammonia water was continued until the pH value of the mixed aqueous solution became 2.0.

The obtained precipitated powder was filtered and washed with a large amount of water, followed by heating at a temperature of 120° C. and drying thereby to prepare a sample of sample number 2.

[Evaluation of Samples]

With respect to each of the samples of the sample numbers 1 and 2, an image was captured using a scanning type electron microscope (SEM), and a mapping analysis of the elements was carried out using a wavelength dispersion type X-ray diffraction apparatus (WDX).

Figure 2:
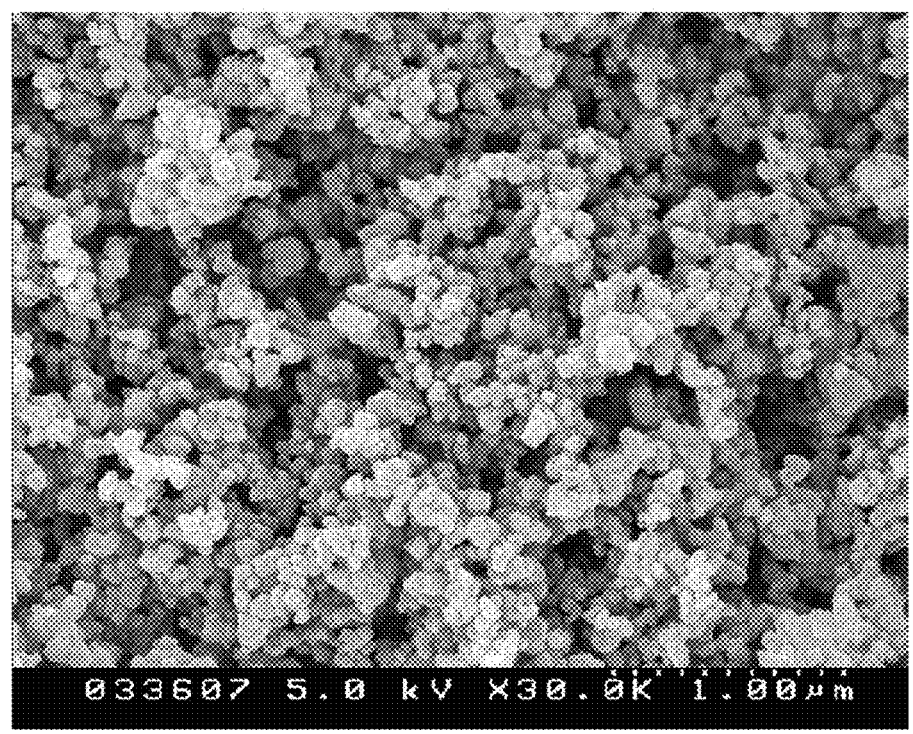
FIG. 2 is an SEM image of the sample number 1.
Figure 3:
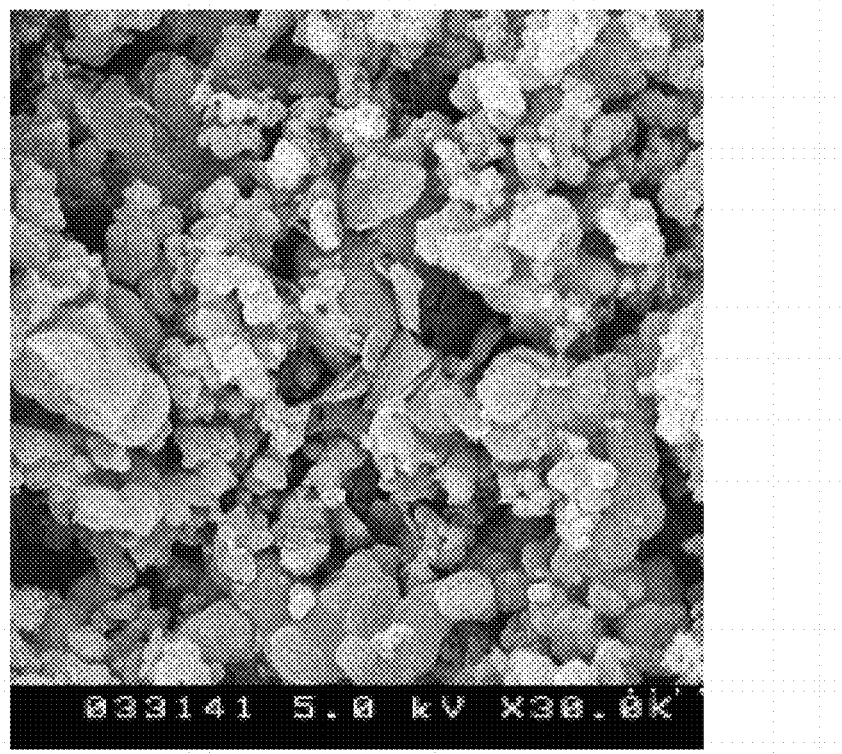
FIG. 3 is an SEM image of the sample number 2.

FIG. 2 is an SEM image of the sample number 1, and FIG. 3 is an SEM image of the sample number 2.

As will be clear from FIG. 3, the sample number 2 had a large variation in the particle size, where particles having a particle size of 100 nm or less and large particles having a particle size of 200 to 300 nm were mixedly present, and moreover it was confirmed that plate-shaped particles were also present.

In contrast, as is shown in FIG. 2, in the sample number 1, the particle size and the shape were comparatively uniform, and it was found out that powder particles having a particle size around 50 nm could be obtained.

Figure 4:
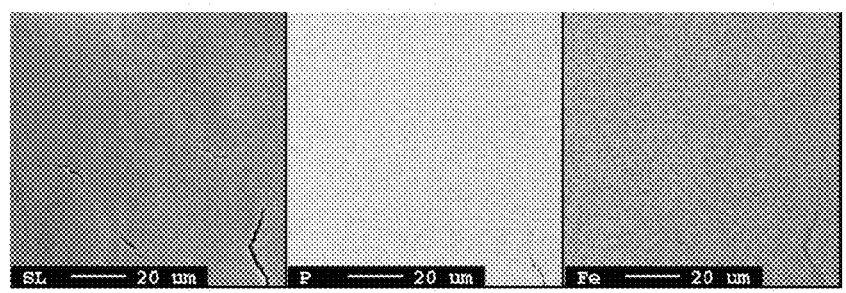
FIG. 4 is a mapping analysis diagram of the sample number 1.
Figure 5:
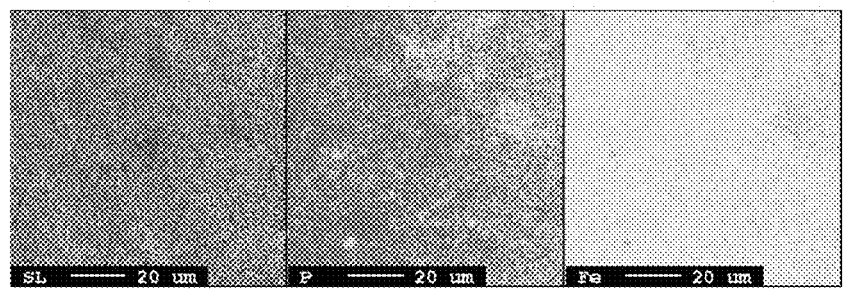
FIG. 5 is a mapping analysis diagram of the sample number 2.

FIG. 4 is a mapping analysis diagram of the sample number 1, and FIG. 5 is a mapping analysis diagram of the sample number 2. In FIGS. 4 and 5, the central view shows a mapping analysis of P; the right view shows a mapping analysis of Fe; and the left view shows an SEM image at the point of measurement.

As will be clear from FIG. 5, in the sample number 2, Fe and P were not uniformly dispersed, and a dispersion unevenness was generated, whereby segregation of particles was recognized. Also, it was found out that a variation in the particle size had been generated.

In contrast, as will be clear from FIG. 4, in the sample number 1, it was found out that Fe and P were uniformly distributed.

From the above, it was confirmed that, by dropwise addition of the mixed aqueous solution into the buffer solution, an $FePO_4$ powder being excellent in the uniform dispersion of the elements of Fe and P and made of fine particles with uniform particle size could be obtained.

EXAMPLE 2

A mixed aqueous solution was prepared by the same method and procedure as those of Example 1.

Subsequently, acetic acid and ammonium acetate were mixed so that the molar ratio of acetic acid and ammonium acetate would be as in Table 1, so as to prepare a buffer solution, and the pH value of the obtained buffer solution was measured. Here, the concentrations of acetic acid and ammonium acetate were adjusted so that the total sum would be 5.0 mol/L.

Subsequently, while stirring the buffer solution at an ordinary temperature, the mixed aqueous solution was dropwise added into the aforesaid buffer solution, thereby to prepare precipitated powders of sample numbers 11 to 18. Here, dropwise addition of the mixed aqueous solution was ended before the pH value of the buffer solution changed by 0.1 from the initial value.

Each of the obtained samples was filtered and washed with a large amount of water, followed by heating to a temperature of 120° C. and drying to prepare brown samples of sample numbers 11 to 18.

Subsequently, the filtrate was collected, and the contents of Fe and P contained in this filtrate were analyzed by inductively-coupled plasma (ICP), whereby the amount of elution of Fe and P that had been eluted without being precipitated was evaluated. Also, from this elution amount, the sample yield of sample numbers 11 to 18 was determined.

Table 1 shows the pH value of the buffer solution (acetic acid and ammonium acetate), the blending molar ratio, the elution amounts of Fe and P, and the yield.

TABLE 1

| | | Buffer solution | | Amount of elution | | Yield |
|---|---|---|---|---|---|---|
| Sample No. | Compositional system | Acetic acid:ammonium acetate (molar ratio) | pH | Fe (mol/L) | P (mol/L) | (%) |
| 11 | Acetic acid - ammonium acetate | 1:2000 | 8.0 | Below or equal to the detection limit | Below or equal to the detection limit | 100 |
| 12 | | 1:200 | 7.0 | Below or equal to the detection limit | Below or equal to the detection limit | 100 |
| 13 | | 1:20 | 6.0 | Below or equal to the detection limit | Below or equal to the detection limit | 100 |
| 14 | | 50:1 | 3.0 | $1.0 \times 10^{-4}$ | $1.5 \times 10^{-3}$ | 99 |
| 15 | | 500:1 | 2.0 | $7.0 \times 10^{-4}$ | $3.2 \times 10^{-3}$ | 98 |

TABLE 1-continued

| Sample No. | Compositional system | Buffer solution Acetic acid:ammonium acetate (molar ratio) | pH | Amount of elution Fe (mol/L) | P (mol/L) | Yield (%) |
|---|---|---|---|---|---|---|
| 16 | | 1800:1 | 1.5 | $1.2 \times 10^{-2}$ | $1.4 \times 10^{-2}$ | 91 |
| 17* | | 2200:1 | 1.4 | $5.0 \times 10^{-2}$ | $5.0 \times 10^{-2}$ | 69 |
| 18* | | 2800:1 | 1.3 | $1.0 \times 10^{-1}$ | $1.0 \times 10^{-1}$ | 38 |

*is outside of the range of the present invention.

As will be clear from this Table 1, in the sample number 17, the pH value of the buffer solution is 1.4, and the pH value is low, so that the amounts of elution of Fe and P are both as large as $5.0 \times 10^{-2}$ mol/L, and the yield decreased to 69%.

In the sample number 18, the pH value of the buffer solution is 1.3, and the pH value is further lower than that of the sample number 17, so that the amounts of elution of Fe and P both increased further to be $1.0 \times 10^{-1}$ mol/L, and the yield decreased to 38%.

In contrast, in the sample numbers 11 to 16, the pH value of the buffer solution is from 1.5 to 8.0 which is within the range of the present invention, so that the amounts of elution of Fe and P were both restrained to be $1.2 \times 10^{-2}$ mol/L or less and, as a result thereof, it has been found out that a yield of 91% or more can be ensured.

EXAMPLE 3

A mixed aqueous solution was prepared by the same method and procedure as those of Example 1.

Subsequently, the compositional system of the buffer solution was made to differ, and a buffer solution adjusted to have a pH value shown in Table 2 was prepared.

Subsequently, while stirring the buffer solution at an ordinary temperature, the mixed aqueous solution was dropwise added into the aforesaid buffer solution, thereby to prepare precipitated powders of sample numbers 21 to 27.

Here, dropwise addition of the mixed aqueous solution was ended before the pH value of the buffer solution changed by 0.1 from the initial value.

Each of the obtained samples was filtered and washed with a large amount of water, followed by heating to a temperature of 120° C. and drying to prepare samples of sample numbers 21 to 27.

Table 2 shows the compositional system of the buffer solution, the pH value thereof, and the color of the precipitated powder in the sample numbers 21 to 27.

TABLE 2

| Sample No. | Buffer solution Compositional system | pH | Color |
|---|---|---|---|
| 21 | Lactic acid - sodium lactate | 3.2 | Brown |
| 22 | Glycolic acid - sodium glycolate | 3.6 | Brown |
| 23 | Maleic acid - disodium maleate | 3.5 | Brown |
| 24 | Glycine - sodium hydroxide | 9.0 | Brown |
| 25* | Glycine - sodium hydroxide | 10.0 | Red |
| 26* | Carbonic acid - sodium bicarbonate | 10.0 | Red |
| 27* | Carbonic acid - sodium bicarbonate | 10.5 | Red |

*is outside of the range of the present invention.

As is shown in this Table 2, in the sample numbers 25 to 27, the precipitated powder had a red color. This seems to be due to the fact that, because the pH value of the buffer solution is as high as 10.0 to 10.5, red $Fe(OH)_3$ was produced. Incidentally, with respect to each of the samples of the sample numbers 25 to 27, element mapping of Fe and P was carried out using a WDX, and it was confirmed that, in the same manner as in the sample number 2 (FIG. 5), Fe and P were not uniformly dispersed and were locally segregated.

In contrast, in the sample numbers 21 to 24, the pH value was 9.0 or less, and the precipitated powder had a brown color indicating $FePO_4$. Incidentally, with respect to each of the samples of the sample numbers 21 to 24, element mapping of Fe and P was carried out using a WDX, and it was confirmed that, in the same manner as in the sample number 1 (FIG. 4), Fe and P were uniformly dispersed.

EXAMPLE 4

A mixed aqueous solution was prepared by the same method and procedure as those of Example 1. Subsequently, a buffer solution was prepared by dissolving the compound shown in Table 3 into water. Subsequently, while stirring the buffer solution at an ordinary temperature, the mixed aqueous solution was dropwise added into the aforesaid buffer solution, thereby to prepare precipitated powders of sample numbers 31 to 35.

Here, the pH value of the buffer solution decreased according as the amount of dropwise addition of the mixed aqueous solution increased, and the dropwise addition of the mixed aqueous solution into the buffer solution was ended at the time point at which the pH value became 2.0. The obtained precipitated powder was filtered and washed with a large amount of water, followed by heating to a temperature of 120° C. and drying to prepare samples of sample numbers 31 to 35.

Table 3 shows the compositional system of the buffer solution, the pH value thereof, and the color of the precipitated powder in the sample numbers 31 to 35.

TABLE 3

| Sample No. | Buffer solution Compositional system | pH | Color |
|---|---|---|---|
| 31 | Glycine | 6.7 | Brown |
| 32 | Ammonium hydrogen tartrate | 7.1 | Brown |
| 33 | Disodium maleate | 7.3 | Brown |
| 34 | Trisodium citrate | 7.8 | Brown |
| 35 | Ammonium acetate | 8.0 | Brown |

As is shown in this Table 3, in all of the sample numbers 31 to 35, the precipitated powder had a brown color indicating $FePO_4$. Incidentally, with respect to each of the samples of the sample numbers 31 to 35, element mapping of Fe and P was carried out using a wavelength dispersion type X-ray diffraction apparatus (WDX), and it was confirmed that, in the same manner as in the sample number 1 (FIG. 4), Fe and P were uniformly dispersed.

Figure 6:
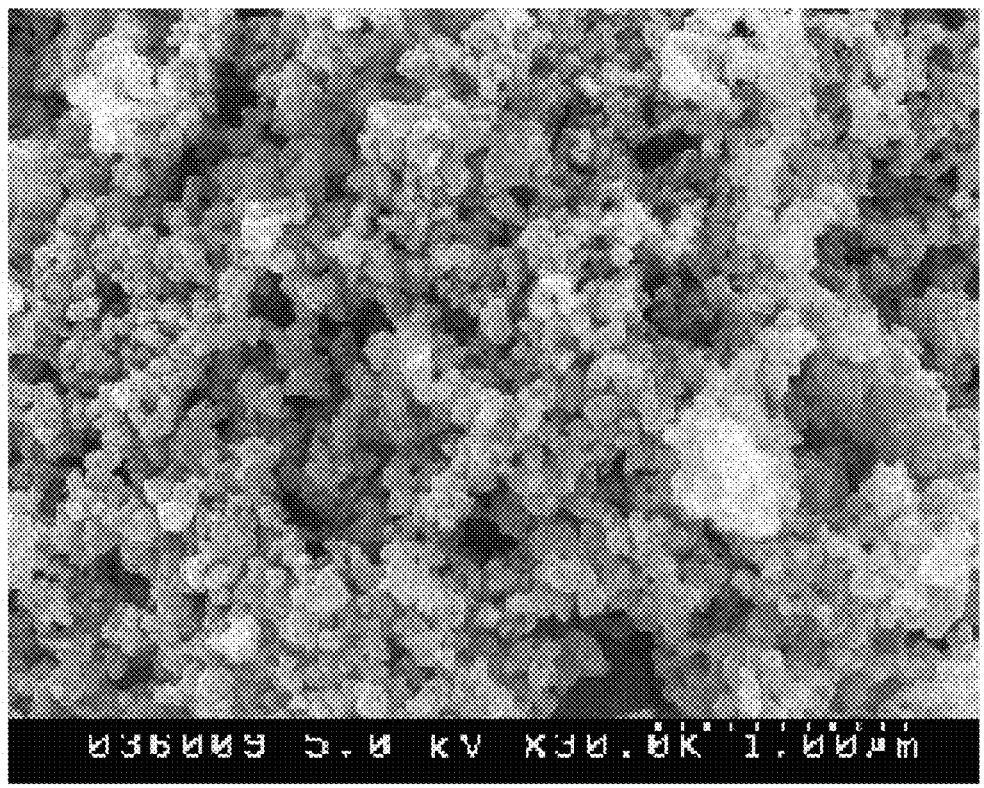
FIG. 6 is an SEM image of the sample number 35.

FIG. 6 is an SEM image of the sample number 35.

As will be clear from this FIG. 6, in the sample number 35, the particle size and the shape were comparatively uniform as in the sample number 1, and it was found out that powder particles having a particle size around 50 nm could be obtained.

EXAMPLE 5

Preparation of Sample Number 41 ($LiFePO_4$)

$FePO_4$ powder obtained in the sample number 1 and $Li(CH_3COO).2H_2O$ serving as a lithium compound were blended so as to attain a molar ratio of 1:1, and pure water and a polycarboxylic acid series polymer dispersing agent were added. The resultant was mixed and crushed using a ball mill so as to obtain a slurry. Subsequently, the obtained slurry was dried with a spray dryer, thereafter granulated, and thermally treated at a temperature of 600° C. for 5 hours by adjusting the atmosphere to be a reducing atmosphere having an oxygen partial pressure of $10^{-20}$ MPa using a mixture gas of $H_2$—$H_2O$, thereby to obtain a sample ($LiFePO_4$) of the sample number 41.

With respect to the sample of the sample number 41, an X-ray diffraction spectrum was measured using an X-ray diffraction apparatus.

Figure 7:
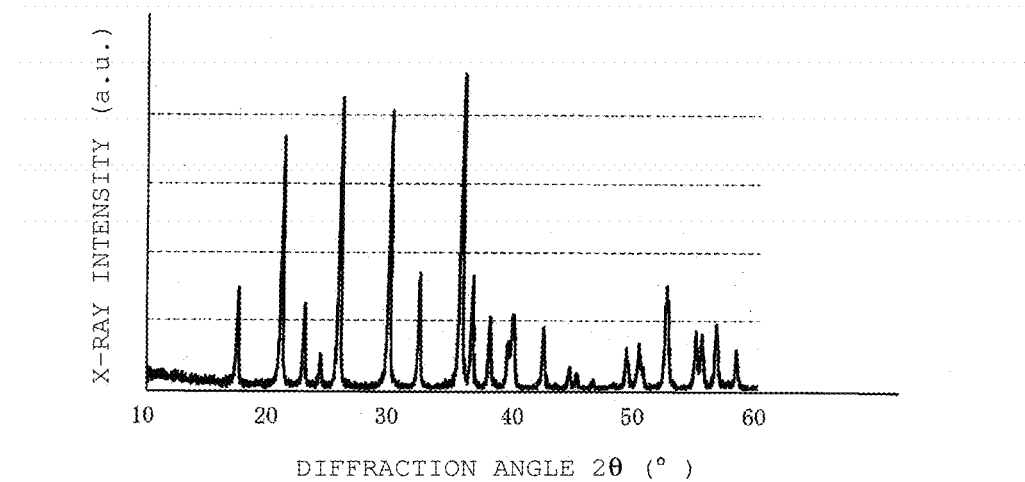
FIG. 7 is a view showing an X-ray diffraction spectrum of the sample number 41.

FIG. 7 shows a result of the measurement thereof. The lateral axis represents a diffraction angle $2\theta(°)$, and the longitudinal axis represents an X-ray intensity (a.u.).

As will be clear from this FIG. 7, it was confirmed that the sample of the sample number 41 was made of a single-phase powder of $LiFePO_4$ with no different phases formed.

Figure 8:
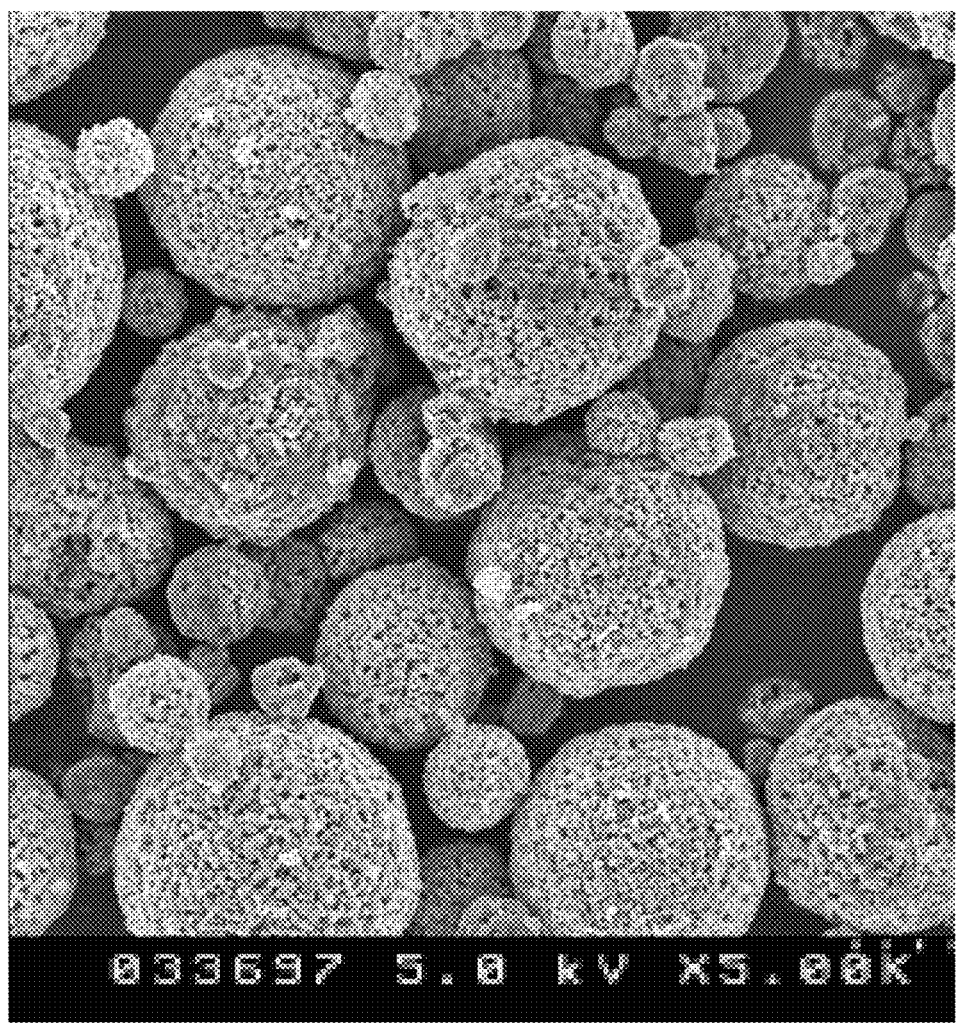
FIG. 8 is an SEM image of the sample number 41.
Figure 9:
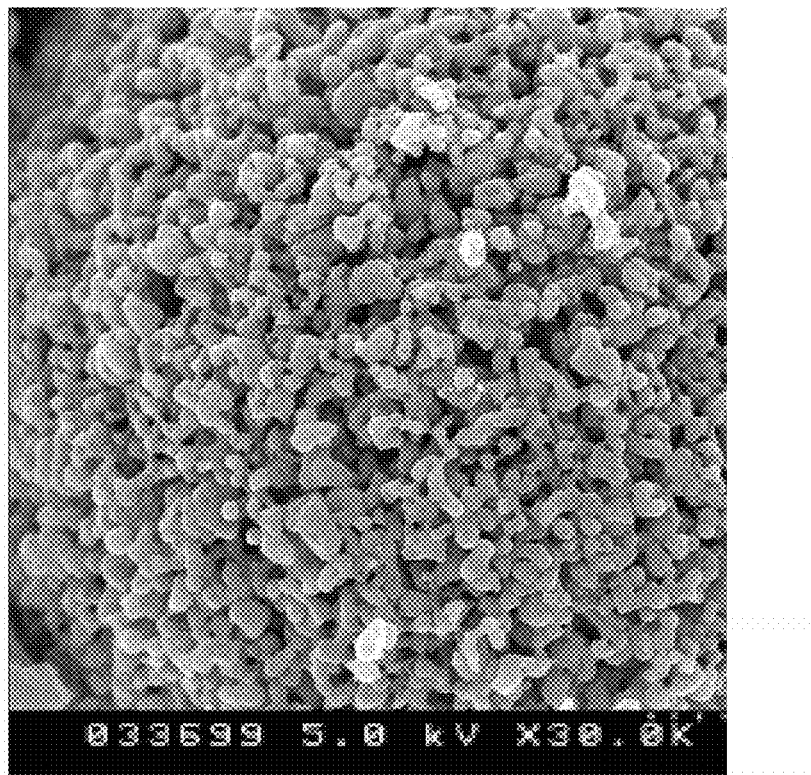
FIG. 9 is an enlarged SEM image of the sample number 41.

Also, FIG. 8 is an SEM image of the sample number 41, and FIG. 9 is an enlarged SEM image of the sample number 41.

As will be clear from these FIGS. 8 and 9, it was found out that the sample of the sample number 41 was made of fine particles having a particle size around 50 nm.

[Preparation of Secondary Battery]

A secondary battery was fabricated using the sample of the sample number 41 ($LiFePO_4$).

First, $LiFePO_4$, acetylene black serving as an electroconductive auxiliary agent, and polyvinylidene fluoride serving as a binding agent were prepared, weighed, and mixed so that these LiFePO4, acetylene black, and polyvinylidene fluoride would attain a weight ratio of 88:6:6. This was dispersed into N-methyl-2-pyrrolidone serving as a solvent to prepare a slurry, and this was applied onto an aluminum foil having a thickness of 20 μm so as to attain 6 mg/cm². The resultant was dried at a temperature of 140° C. and thereafter pressed under a pressure of 98 MPa, thereby to fabricate an electrode sheet. The electrode sheet was then stamped out to have a diameter of 12 mm, so as to prepare a positive electrode containing a positive electrode active substance mainly made of $LiFePO_4$.

Next, this positive electrode was immersed into an electrolytic solution so as to allow the electrolytic solution to penetrate into a gap within the positive electrode. As the electrolytic solution, a mixed solution of ethylene carbonate/diethyl carbonate which was an organic solvent containing $LiPF_6$ (electrolyte salt) having a molar concentration of 1.0 mol/L was used. Here, the mixing ratio of ethylene carbonate and diethyl carbonate was set to be ethylene carbonate: diethyl carbonate=3:7 in vol %.

Subsequently, this positive electrode was mounted on a positive electrode collector. Further, a separator made of a polypropylene porous film impregnated with the aforesaid electrolytic solution and having a thickness of 20 μm was stacked onto the aforesaid positive electrode, and further a negative electrode obtained by applying lithium on both sides of a copper foil was stacked onto the separator. Then, after a negative electrode collector made of Cu was stacked onto the negative electrode, the electrolytic solution was injected into the inside space. Thereafter, a spring made of metal was mounted on the negative electrode collector and, in a state in which a gasket was disposed in the peripheries, a negative electrode case was joined to a positive electrode case, followed by outer-cladding and sealing with use of a caulking machine, thereby to prepare a secondary battery having a diameter of 20 mm and a thickness of 3.2 mm, having $LiFePO_4$ as a major component of the positive electrode active substance, and having metal lithium as the negative electrode active substance.

[Confirmation of Operation of Secondary Battery]

This secondary battery was charged and discharged in a thermostatic tank of 25° C. with a voltage range of 2.0 to 4.2 V and a charging/discharging rate of 0.2 C (1 C is an amount of electric current until the charging or discharging ends in one hour). In other words, the secondary battery was charged at a charging rate of 0.2 C until the voltage reached 4.2 V, and thereafter discharged at a discharging rate of 0.2 C until the voltage reached 2.0 V.

Figure 10:
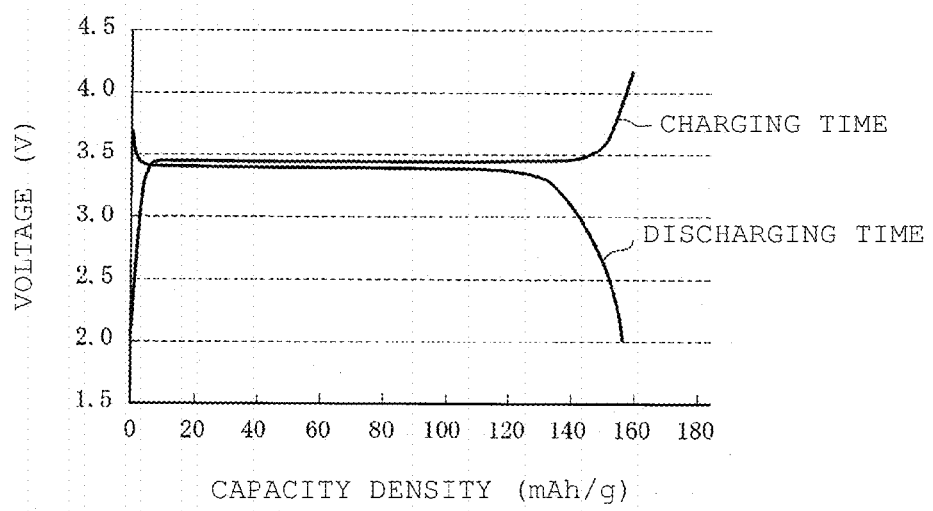
FIG. 10 is a charging/discharging curve of the secondary battery obtained by using the sample number 41 as a positive electrode active substance.

FIG. 10 shows a result of measurement thereof, where the lateral axis represents a capacity density (mAh/g), and the longitudinal axis represents a voltage (V).

As is shown in this FIG. 10, it was confirmed that this secondary battery was a secondary battery having a flat voltage part with a charging/discharging voltage of about 3.4 V.

Then, the capacity density per electrode active substance was calculated from the discharging capacity, with a result that a high capacity of 155 mAh/g could be obtained.

From a P source and a trivalent Fe compound, $FePO_4$ having a high purity can be obtained at a high efficiency, and $LiFePO_4$ obtained from this $FePO_4$ can be used as a positive electrode material of a secondary battery.

DESCRIPTION OF REFERENCE SYMBOLS 4 positive electrode
6 negative electrode
9 electrolyte

The invention claimed is:

1. A method of producing iron phosphate, the method comprising bringing a mixed aqueous solution, in which a phosphorus source and an iron compound containing trivalent iron are dissolved, into contact with a buffer solution having a pH value of 1.5 to 9 to produce a powder consisting of iron phosphate.

2. The method according to claim 1, further comprising synthesizing the powder consisting of iron phosphate with a lithium compound to produce lithium iron phosphate.

3. The method according to claim 2, wherein the synthesizing further comprises:

mixing the powder consisting of iron phosphate and the lithium compound in a molar ratio of 1:1 to obtain a mixed powder; and heat treating the mixed powder in a reducing atmosphere to produce the lithium iron phosphate.

4. The method according to claim 2, further comprising forming an electrode active substance with the lithium iron phosphate.

5. The method according to claim 1, further comprising preparing the mixed aqueous solution.

6. The method according to claim 5, wherein the mixed aqueous solution is prepared by mixing a divalent Fe compound, the phosphorus source, and an oxidant.

7. The method according to claim 6, wherein the divalent Fe compound and the phosphorous source are mixed in approximately equal molar ratio amounts, and the oxidant is in a greater molar ratio amount.

8. The method according to claim 1, wherein the mixed aqueous solution is added to the buffer solution.

9. The method according to claim 8, wherein the addition of the mixed aqueous solution to the buffer solution is ended before the pH reaches 1.5.

10. Lithium iron phosphate obtained by synthesizing the iron phosphate produced by the production method according to claim 1 and a lithium compound.

11. An electrode active substance, wherein lithium iron phosphate according to claim 2 is contained therein as a major component.

12. A secondary battery having a positive electrode, a negative electrode, and an electrolyte, wherein the positive electrode is formed of the electrode active substance according to claim 11.

* * * * *